United States Patent
Bulpin

(10) Patent No.: US 11,144,655 B2
(45) Date of Patent: Oct. 12, 2021

(54) CONTROL VIEWING ACCESS TO DOCUMENTS IN COLLABORATIVE SCENARIOS USING FACIAL RECOGNITION FROM WEBCAMS

(71) Applicant: CITRIX SYSTEMS, INC., Fort Lauderdale, FL (US)

(72) Inventor: James Roy Bulpin, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 284 days.

(21) Appl. No.: 15/970,079

(22) Filed: May 3, 2018

(65) Prior Publication Data
US 2019/0340373 A1     Nov. 7, 2019

(51) Int. Cl.
*G06F 21/62* (2013.01)
*G06F 16/93* (2019.01)
*G06F 21/32* (2013.01)
*G06F 21/60* (2013.01)
*G06K 9/00* (2006.01)

(52) U.S. Cl.
CPC .......... *G06F 21/6209* (2013.01); *G06F 16/93* (2019.01); *G06F 21/32* (2013.01); *G06F 21/604* (2013.01); *G06K 9/00288* (2013.01)

(58) Field of Classification Search
CPC ........ G06F 21/32; G06F 16/93; G06F 21/604; G06F 21/6209; G06K 9/00288; H04L 63/0861; H04L 63/101
See application file for complete search history.

(56) References Cited

U.S. PATENT DOCUMENTS 8,752,138 B1 *  6/2014  Bennett ................. H04L 67/141
                                                          726/4
9,176,744 B2   11/2015  Lee
9,538,345 B2    1/2017  Sah et al.
(Continued)

OTHER PUBLICATIONS

Jain, A.K. • Klare, B. • Park, U.; Face recognition: Some challenges in forensics; Face and Gesture 2011 (pp. 726-733); (Year: 2011).*
(Continued)

*Primary Examiner* — Luu T Pham
*Assistant Examiner* — Chao Wang
(74) *Attorney, Agent, or Firm* — Allen, Dyer, Doppelt + Gilchrist, PA

(57) ABSTRACT

A computing device includes a face detection module coupled to a webcam. The face detection module detects faces of viewers within a field of view of the webcam, provides images of the detected faces to a face identification service, and receives user IDs on the detected faces that have been identified. A document viewer module retrieves a document for display, with the document being retrieved based on a link to the document. A policy enforcement module receives the user IDs on the detected faces that have been identified, uses the link to the document to query metadata associated with the document to determine an access control list for the document, and compares the user IDs of the detected faces that have been identified to user IDs on the access control list to determine authorized viewers of the document. The policy enforcement module obscures display of the document if one of the identified faces is not authorized to view the document.

20 Claims, 8 Drawing Sheets

(56) References Cited

U.S. PATENT DOCUMENTS

| | | | | |
|---|---|---|---|---|
| 9,635,317 | B1* | 4/2017 | Ludwig | H04N 21/4408 |
| 10,027,727 | B1* | 7/2018 | Ozog | G06K 9/00926 |
| 2002/0191817 | A1* | 12/2002 | Sato | G06K 9/00288 |
| | | | | 382/118 |
| 2007/0188598 | A1 | 8/2007 | Kenoyer | |
| 2010/0124363 | A1 | 5/2010 | Ek et al. | |
| 2013/0097667 | A1* | 4/2013 | Pulfer | G06F 21/6218 |
| | | | | 726/1 |
| 2014/0075528 | A1* | 3/2014 | Matsuoka | G06F 21/32 |
| | | | | 726/7 |
| 2014/0198958 | A1 | 7/2014 | Nathan et al. | |
| 2017/0339216 | A1 | 11/2017 | Carlos et al. | |
| 2018/0061158 | A1* | 3/2018 | Greene | G06K 9/00885 |
| 2018/0188930 | A1* | 7/2018 | Ji | G06F 3/04847 |

OTHER PUBLICATIONS

K.W. Bowyer; Face recognition technology: security versus privacy; IEEE Technology and Society Magazine (vol. 23, Issue: 1, pp. 9-19); (Year: 2004).*

Al Bouna, B. • Chbeir, R. • Gabillon, A. • Capolsini, P.; A Fine-Grained Image Access Control Model; 2012 Eighth International Conference on Signal Image Technology and Internet Based Systems (pp. 603-612); (Year: 2012).*

* cited by examiner

CONTROL VIEWING ACCESS TO DOCUMENTS IN COLLABORATIVE SCENARIOS USING FACIAL RECOGNITION FROM WEBCAMS

TECHNICAL FIELD

The present disclosure relates to computing devices operating within collaborative scenarios, and more particularly, to using facial recognition to control viewing access to documents displayed by a computing device within a collaborative scenario.

BACKGROUND

With products such as ShareFile an administrator has good control over the dissemination of documents. Documents may be prevented, for example, from being forwarded to unauthorized viewers when using ShareFile. However, in a collaborative environment such as a meeting room many of these protections are unavailable due to the ability of unauthorized viewers to simply look at the screen of an authorized user.

In terms of unauthorized viewers in a collaborative environment, two different threat models may be defined. One threat model may be referred to as a malicious model where an unauthorized viewer deliberately attempts to view a document by looking at the screen of an authorized user.

Another threat model may be referred to as a non-malicious model where a viewer views a document that they are not currently authorized to view. For example, user X may view the document by seeing it on the screen in a meeting room where user Y is an authorized user showing the document but is not aware that user X is not authorized. Alternatively, compliance rules may require tracking of who has seen the document. In this case, user X may be allowed to see the document but this needs to be recorded. The non-malicious model is a particular concern where there may be an inadvertent sharing of a document with one or more unauthorized users.

SUMMARY

A computing device includes at least one webcam, and a face detection module coupled to the at least one webcam. The face detection module may detect faces of viewers that are within a field of view of the at least one webcam, provide an image of the detected faces to a face identification service, and receive user IDs from the face identification service on the detected faces that have been identified. The computing device may include a document viewer module to retrieve a document for display, with the document being retrieved based on a link to the document.

The computing device may further include a policy enforcement module coupled to the face detection module and to the document viewer module. The policy enforcement module may receive the user IDs on the detected faces that have been identified in the image, use the link to the document to query metadata associated with the document to determine an access control list for the document, and compare the user IDs of the detected faces that have been identified to user IDs on the access control list to determine authorized viewers of the document. The policy enforcement module may obscure display of the document if one of the identified faces is not authorized to view the document.

The computing device allows unauthorized viewers to be detected, and further provides an approval process to approve the unauthorized viewers so that a document that is part of a collaborative environment may be displayed within a meeting room.

The computing device controls the dissemination of information in a collaborative meeting room, and display of the document may be obscured until the approval process is completed. Since there is typically a lack of malicious intent by the unauthorized viewers, the approval process advantageously allows the unauthorized viewers to be quickly approved so that the collaborative meeting may continue.

The face detection module may be further configured to provide an image of the detected faces to the policy enforcement module. The policy enforcement module may be further configured to display the image with a respective symbol, user ID and authorization status overlaid on each identified face.

If the image includes faces that cannot be identified, then the policy enforcement module may be further configured to perform at least one of the following: overlay text indicating that a face cannot be identified, or leave each face that cannot be identified as is without any markings.

When a viewer has been identified by the face identification service but is not authorized to view the document, the policy enforcement module may be further configured to access an approval service to add to the access control list a user ID of the identified face not authorized to view the document. Display of the document is unobscured since a viewer with the identified face not authorized to view the document is now authorized to view the document.

The approval service may be configured to send an approval request to an owner of the document requesting approval of the viewer with the identified face not authorized to view the document to be added to the access control list. If the owner of the document approves, then an approval request is sent to the viewer having the identified face not authorized to view the document. If the viewer having the identified face not authorized to view the document accepts the approval request, then update the access control list to include the user ID of the identified face not authorized to view the document.

The approval request to the viewer having the identified face not authorized to view the document may include terms and conditions for the viewer to agree to before accepting the approval request.

When a viewer cannot be identified by the face identification service, the policy enforcement module may be further configured to contact the approval service to add a user ID of each face that cannot be identified to the access control list if not already on the access control list, and provide an image of each face that cannot be identified along with the user ID to the face identification service so that a database of the face identification service is updated. The policy enforcement module may then unobscure display of the document since each corresponding viewer that cannot be identified is now authorized to view the document.

The approval service may be configured to perform the following before adding the user ID of each face that cannot be identified to the access control list if not already on the access control list. An approval request is sent to an owner of the document requesting approval of each viewer that cannot be identified to be added to the access control list. If the owner of the document approves, then the owner of the document provides a user ID for each viewer that cannot be identified. An approval request is then sent to each viewer that cannot be identified. Acceptance is received from each viewer that accepted the approval request.

When recognition of an unidentified viewer is to be overridden, the policy enforcement module may be further configured to suppress recognition of each face that cannot be identified if an owner of the document approves the suppression, and unobscure display of the document.

The metadata of the document may include user IDs of viewers allowed to view the document. The computing device may be configured as a virtual computing device. Obscuring display of the document may include hiding, blurring, or pixelating the document.

Another aspect is directed to a method for operating the policy enforcement module cooperating with a computing device as described above. The method may comprise receiving from the face identification service user IDs on detected faces that have been identified in the image; using the link to the document being retrieved for display to query metadata associated with the document to determine an access control list for the document; comparing the user IDs of the detected faces that have been identified to user IDs on the access control list to determine authorized viewers of the document; and obscuring display of the document if one of the identified faces is not authorized to view the document.

Yet another aspect is directed to a non-transitory computer readable medium for a policy enforcement module cooperating with a computing device as described above, with the non-transitory computer readable medium having a plurality of computer executable instructions for causing the policy enforcement module to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
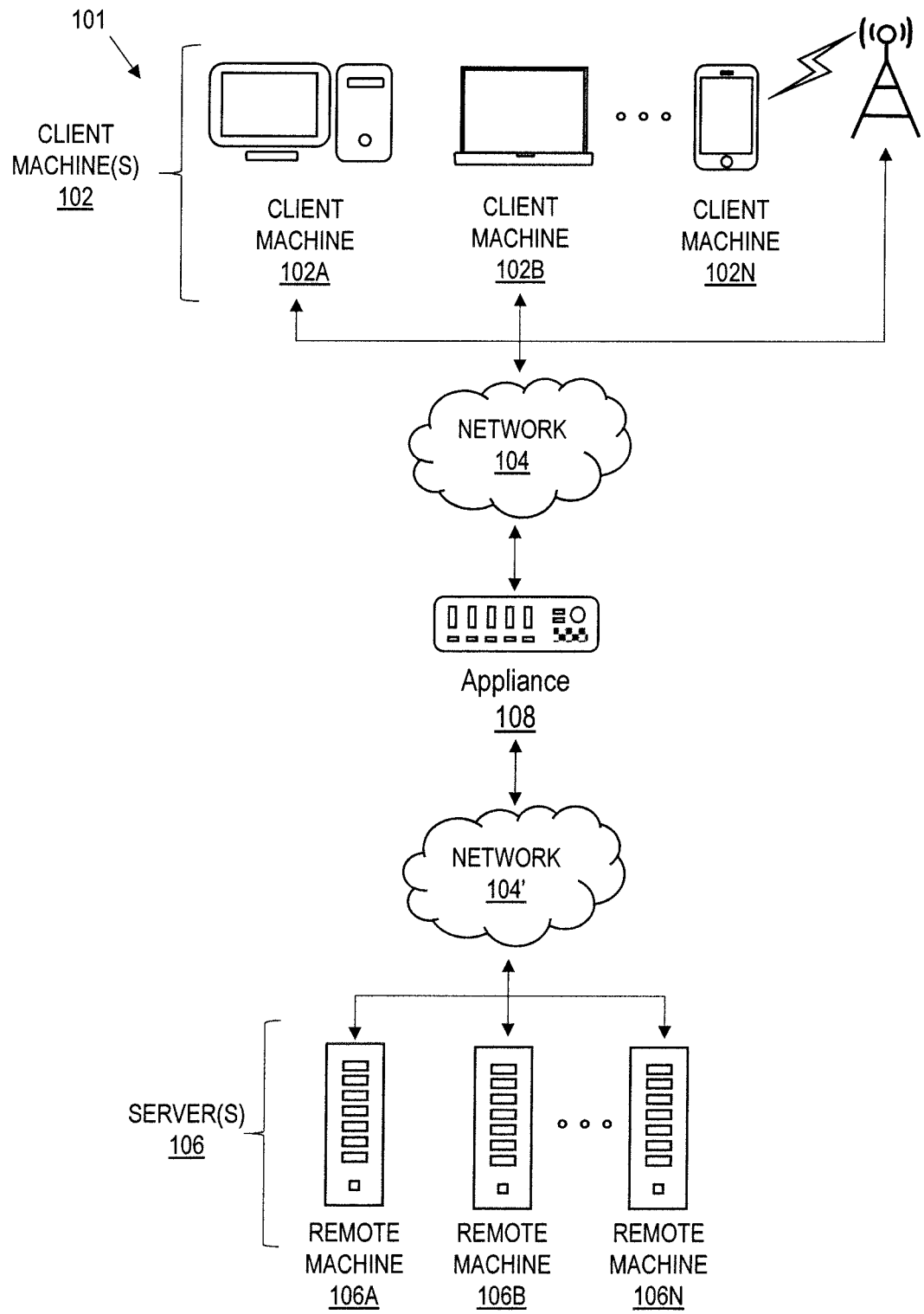
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following:

software; a program; executable instructions; a virtual machine; a hypervisor; a web browser; a web-based client; a client-server application; a thin-client computing client; an ActiveX control; a Java applet; software related to voice over Internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
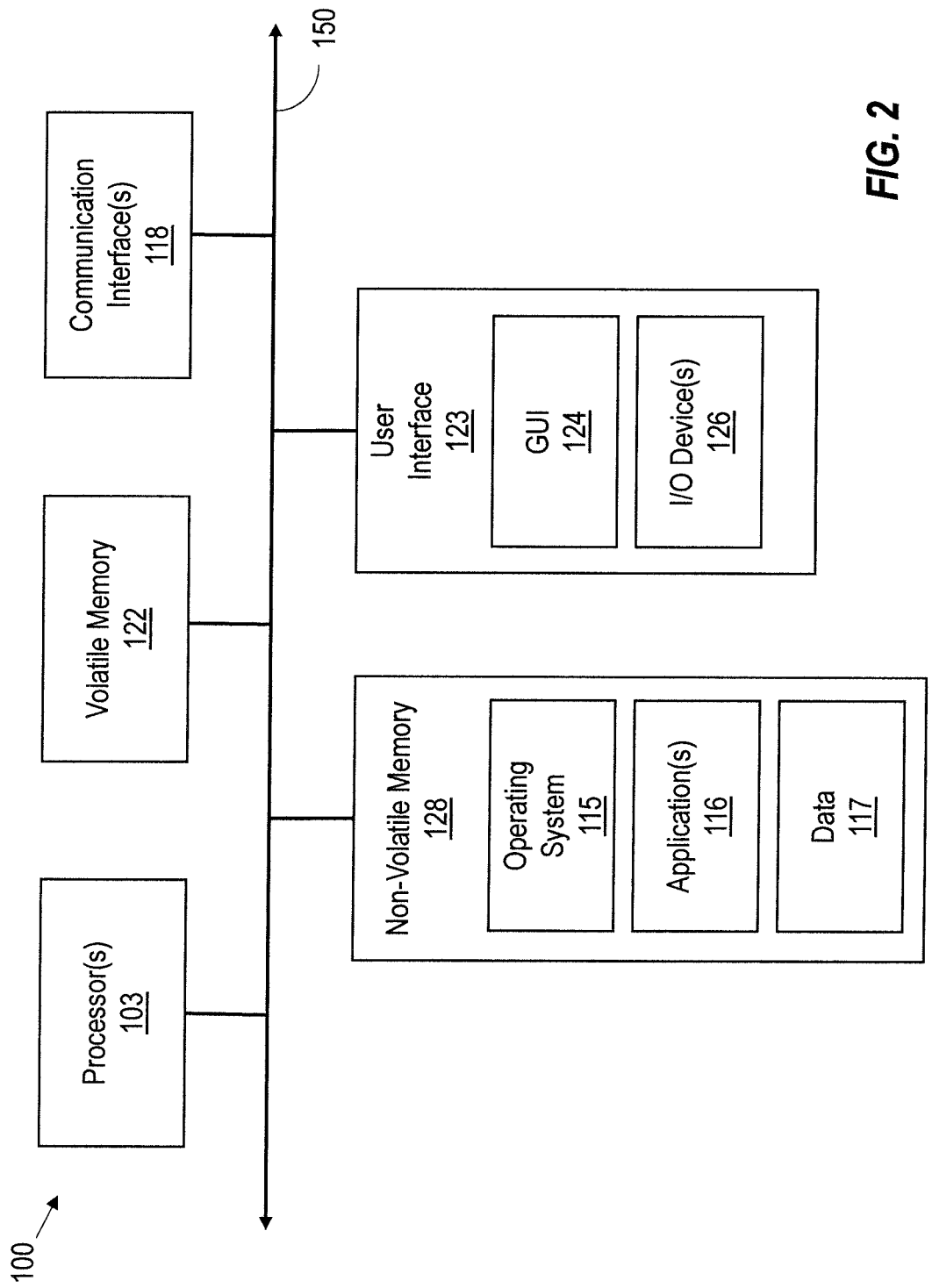
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
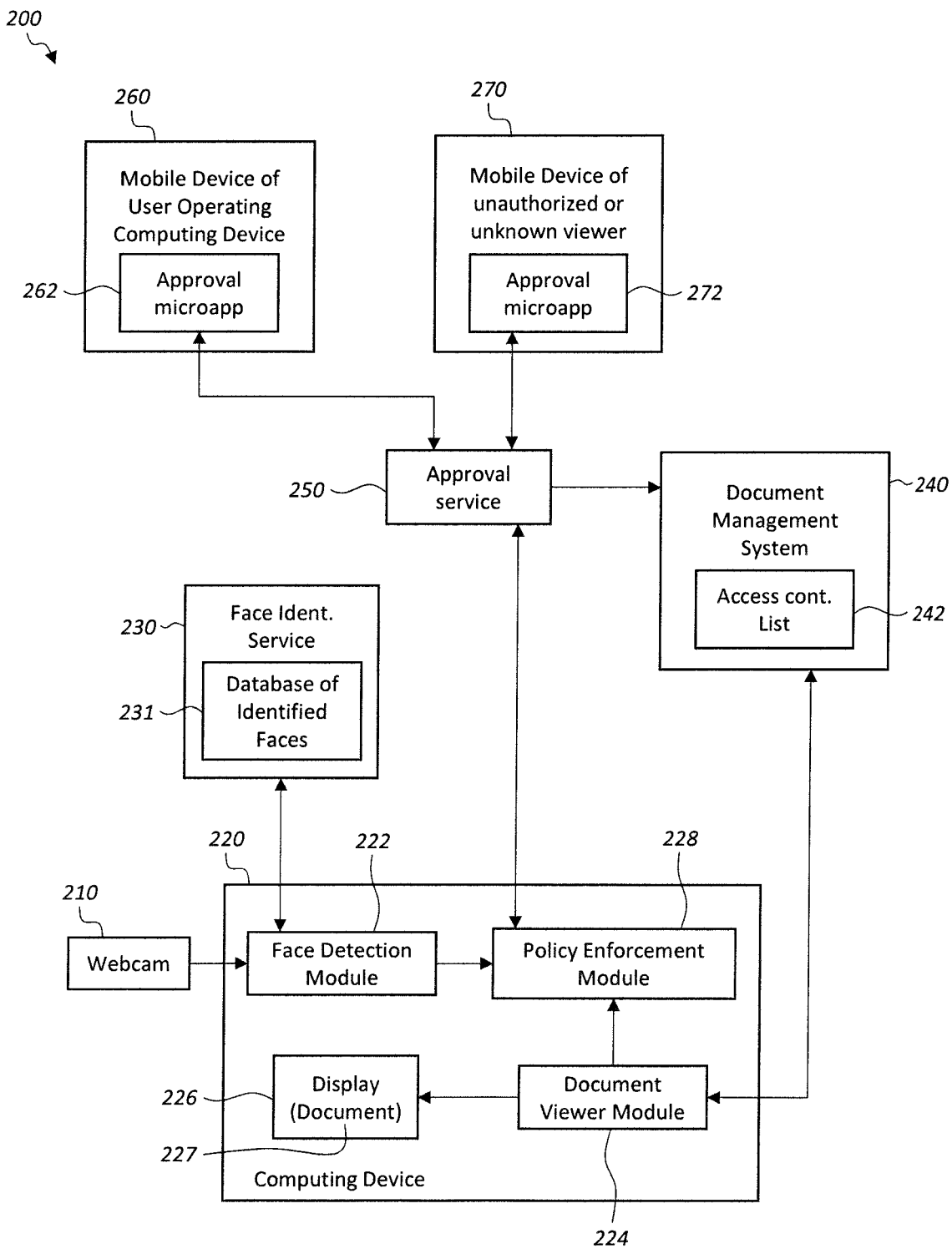
FIG. 3 is a block diagram of an architecture to control viewing access to documents in collaborative scenarios using facial recognition from webcams in which various aspects of the disclosure may be implemented.

Referring now to FIG. 3, an architecture 200 to control viewing access to documents in collaborative scenarios using facial recognition from webcams 210 will be discussed.

At a high level, the architecture 200 uses the webcams 210 in a collaborative meeting room to periodically grab images of the people present in the room. It then uses facial recognition to identify the user IDs of the people present. In parallel the desktop (which may be a virtual desktop) tracks which document is being displayed on the screen, assuming the document comes from a managed source such as Share- File. The policy enforcement module 228 may also be referred to as a software entity that may be local to the desktop or run as a cloud service. When a user first opens a document to display on a screen, it registers this with the policy enforcement module 228. The policy enforcement module 228 accesses the document metadata to acquire the list of user IDs that are authorized to view the document.

In a collaborative environment such as a meeting room with webcams 210, the webcams may be used to detect and identify faces that are visible to the webcams. The identified faces may be correlated with an access control list on any document currently being shown on a screen and which is visible to the users. The document/screen may then be obscured should it be determined that an unauthorized user is viewing the document/screen within the meeting room. The document/screen may be obscured by hiding, blurring, pixelating, etc. the document/screen.

The illustrated architecture 200 also provides a lightweight approval process to quickly add detected unauthorized users to the access control list if the document owner decides that the unauthorized users are to be authorized.

Facial recognition combined with a document access control list provides continuous access control list enforcement. A level of authorization for people physically present in the meeting room may be performed but not logged into any computing system. A document approval workflow initiated by facial recognition is also provided as described below.

As will be explained in detail below, the architecture 200 allows unauthorized viewers to be detected, and provides an approval process to approve the unauthorized viewers so that a document that is part of a collaborative environment may be displayed within a meeting room.

The unauthorized viewers may be viewers that have been identified by facial recognition but are not authorized to view the document, or may be viewers that are unknown and cannot be identified by facial recognition. The unknown viewers may be authorized to view the document but they are listed as unknown since they cannot be identified by facial recognition.

A computing device 220 displaying the document is configured to detect the unauthorized viewers, and provide an approval process so that the unauthorized viewers can be authorized to view the document if the document owner agrees and the unauthorized viewers first agree to terms and conditions prior to being authorized.

The computing device 220 controls the dissemination of information in the meeting room, and display of the document may be obscured until the approval process is completed. Since there is typically a lack of malicious intent by the unauthorized viewers, the approval process advantageously allows the unauthorized viewers to be quickly approved so that the collaborative meeting may continue.

The meeting room providing the collaborative environment includes at least one webcam 210. The computing device 220 includes a face detection module 222 coupled to the webcam 210. The face detection module 222 detects faces of viewers that are within a field of view of the webcam 210. The face detection module 222 does not identify the faces.

The face detection module 222 periodically provides images of the detected faces to a face identification service 230 for identification. The face identification service 230 is an enrollment service where user IDs are associated with known faces and stored in a database 231. The face identification service 230 may be based on Microsoft Azure facial recognition software, for example, which is cloud-based.

The face identification service 230 compares the detected faces to the faces that are enrolled in the service to identify the user IDs of the viewers present. For the faces that are positively identified, the face identification service 230 provides the corresponding user IDs to the face detection module 222. For the faces that cannot be identified, this information is also provided to the face detection module 222.

A document viewer module 224 within the computing device 220 retrieves a document for display based on a link to the document. The document viewer module 224 launches an application that retrieves the document for display based on the link. The application may be Microsoft Word or Microsoft PowerPoint, for example. The document may come from a document management system 240, such as ShareFile or Dropbox, for example.

The document viewer module 224 may be configured as a processor and memory where the memory stores the application that is executed by the processor for retrieving the document for display. The document viewer module 224 may be local to the computing device 220, or may be configured as a virtual platform managed by a hypervisor developed by Citrix Systems, for example.

In the illustrated embodiment, the computing device 220 includes a display 226 to display the retrieved document 227. In other embodiments, the document 227 may be projected onto a screen external the computing device 220.

The computing device 220 includes a policy enforcement module 228. The policy enforcement module 228 receives input from the face detection module 222 and from the document viewer module 224. The face detection module 222 provides user IDs for the known detected faces as well as information on the unknown detected faces as determined by the face identification service 230. The document viewer module 224 provides the link of the document 227 to be displayed to the policy enforcement module 228.

The policy enforcement module 228 uses the document link to query metadata associated with the document. The metadata includes user IDs of the users that are authorized to view the document 227. The metadata is queried where the document is stored. For example, the document may be externally stored, such as in the document management system 240. An access control list (AOL) 242 for the document 227 is also stored with the document management system 240. In other embodiments, the document 227 may be stored locally with the computing device 220. In this case, an access control list for the document would be stored locally with the computing device 220.

The policy enforcement module 228 compares the user IDs for the known detected faces to the user names obtained from the document metadata. If the user ID of one of the known detected faces does not match one of the user names provided by the document metadata, then the policy enforcement module 228 obscures the document 227 from view on the display 226. The document 227 may be obscured from viewing by hiding, blurring or pixelating display of the document window.

Figure 4:
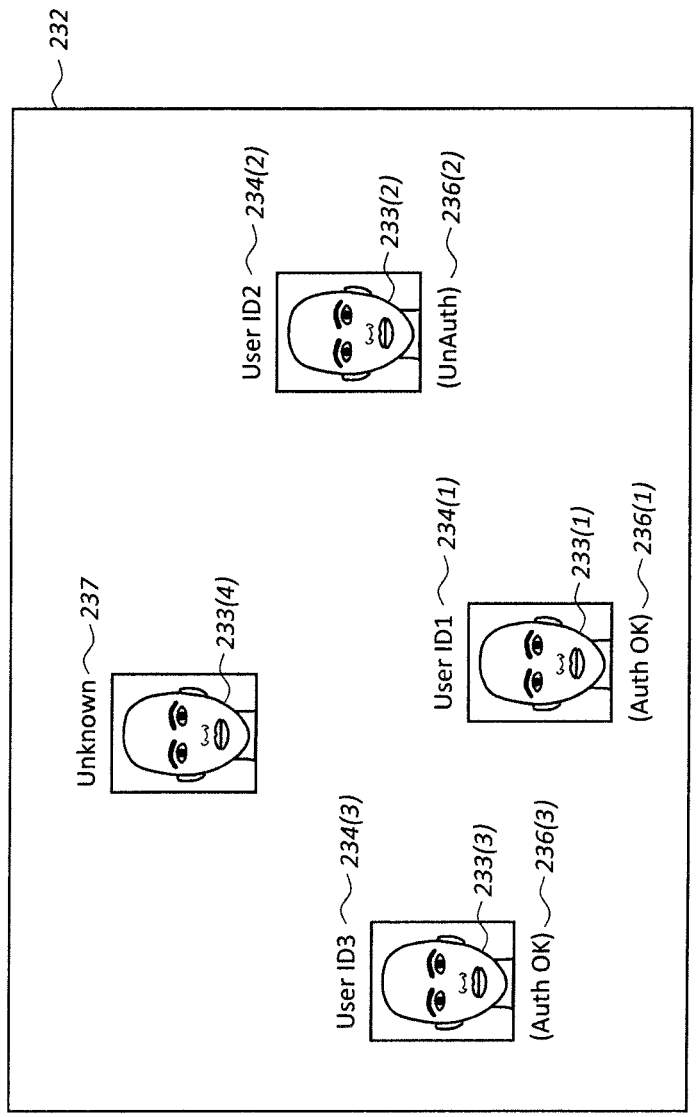
FIG. 4 is an image of viewer faces as identified by the face identification service operating within the architecture illustrated in FIG. 3.

At this point the face detection module 222 may provide an image 232 of the detected faces 233(1)-233(4) to the policy enforcement module 228. The policy enforcement module 228 then displays the image 232 with a respective symbol, user ID 234(1)-234(3) and authorization status 236(1)-236(3) overlaid on each identified face 233(1)-233(3), as illustrated in FIG. 4. The symbols may be squares, for example, placed around each face that can be identified by the face identification service 230. Each identified face and corresponding user ID are stored within a database 231 of identified faces at the face identification service 230.

This allows the document owner, who will typically be operating the computing device 220, to quickly access which viewers are authorized and which viewers are not authorized. The illustrated image 232 includes viewer face 1 233(1) who is authorized and is also the document owner, viewer face 2 233(2) who is not authorized, and viewer face 3 233(3) who is authorized.

If the image 232 includes a detected face that cannot be identified, such as viewer face 4 233(4), then the policy enforcement module 228 may overlay text 237 (e.g., "unknown") indicating that the face cannot be identified, or leave the face without any markings.

The policy enforcement module 228 initiates the approval process by accessing a cloud-based approval service 250. The policy enforcement module 228 calls an API of the approval service 250. One approval condition is when a face of a viewer has been identified by the face identification service 230 but is not authorized to view the document. In this approval condition the enforcement policy module 228 accesses the approval service 250 to add to the access control list a user ID of the identified face not authorized to view the document. The document 227 is unobscured by the policy enforcement module 228 when the viewer with the identified face that was previously not authorized to view the document is now authorized to view the document.

More particularly, the approval service 250 sends an approval request to the owner of the document requesting approval of the viewer with the identified face not authorized to view the document to be added to the access control list 242. The approval request may be sent to a mobile device 260 belonging to the owner of the document. An approval microapp 262 within the mobile device 260 allows for quick approval. Other methods of contacting the document owner may readily be used, such as contacting the owner by displaying a message on the display 226.

If the owner of the document approves, then the approval service 250 sends an approval request to the viewer having the identified face not authorized to view the document. The approval request may be sent to a mobile device 270 belonging to the viewer having the identified face not authorized to view the document. An approval microapp 272 within the mobile device 270 allows for quick approval.

If the viewer having the identified face not authorized to view the document accepts the approval request, then the approval service 250 updates the access control list 242 to include the user ID of the identified face not authorized to view the document.

As noted above, the approval request to the viewer having the identified face not authorized to view the document may include terms and conditions associated with the document, such as agreeing to a non-disclosure agreement. If the viewer having the identified face not authorized to view the document accepts the terms and conditions, then this information is provided to the policy enforcement module 228.

If the document owner does not want to authorize the viewer having the identified face not authorized to view the document, then the document owner ceases showing the document 227. Alternatively, the document owner may have the viewer having the identified face not authorized to view be removed from the meeting room.

Another approval condition is when the viewer cannot be identified by the face identification service 230. Here, the face detection module 222 receives information from the face identification service 230 on each face that cannot be identified. The policy enforcement module 228 contacts the approval service 250 to add a user ID of each face that cannot be identified to the access control list 242 if not already on the access control list.

An image of each face that cannot be identified along with the user ID is also provided to the face identification service 230 by the policy enforcement module 228 so that the database 231 of the face identification service 230 is updated. The policy enforcement module 228 then unobscures display of the document 227 since each corresponding viewer that was previously not identified is now authorized to view the document.

In this approval condition, the approval service 250 performs the following before adding the user ID of each face that cannot be identified to the access control list 242 if not already on the access control list. The approval service 250 sends an approval request to the owner of the document requesting approval of each viewer that cannot be identified to be added to the access control list 242. If the owner of the document approves, then the owner of the document provides a user ID for each viewer that cannot be identified. The owner of the document will see the image of each viewer that cannot be identified in the approval microapp 262 and provide a user ID for each viewer that cannot be identified. The owner of the document is essentially performing the facial recognition function along with the approval. Next, an approval request is sent to each viewer that cannot be identified. The approval service 250 then receives acceptance from each viewer that accepted the approval request.

Yet another approval condition is directed to an override feature when a viewer cannot be identified by the face identification service 230. Here, the face detection module 222 receives information from the face identification service 230 on each face that cannot be identified. The policy enforcement module 228 suppresses recognition of each face that cannot be identified during a remainder of the documents to be viewed if the owner of the document approves the suppression. Display of the document is unobscured at this point.

Figure 5:
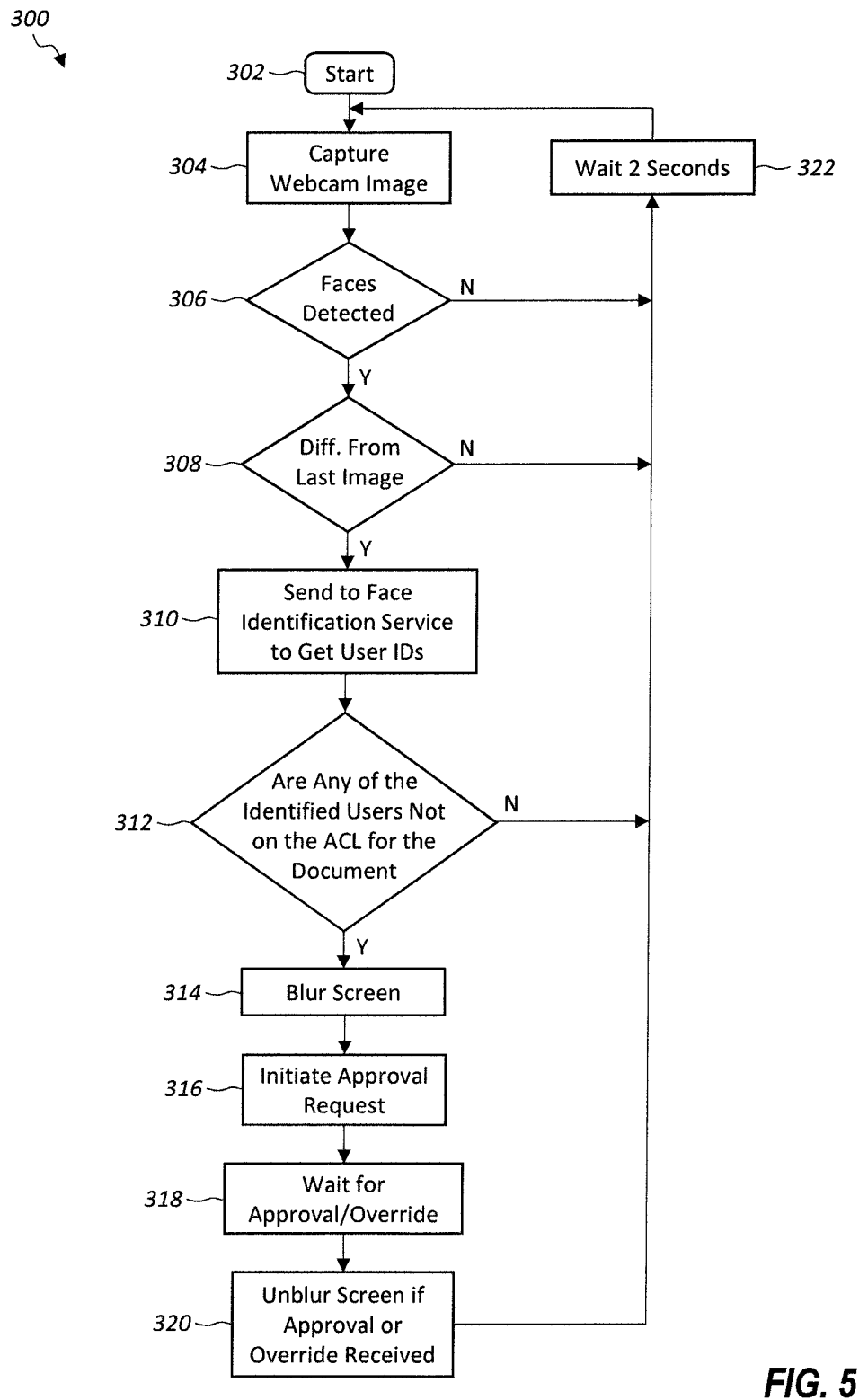
FIG. 5 is a flowchart illustrating a method for controlling viewing access to documents within the architecture illustrated in FIG. 3.

Referring now to FIG. 5, a flowchart 300 illustrating a method for controlling viewing access to documents within the architecture 200 will be discussed. The illustrated flowchart may operate in a continuous loop. From the start (Block 302), during a meeting or other multi-person scenario, the webcam 210 captures an image at Block 304 which is provided to the face detection module 222. The face detection module 222 executes a local face detection algorithm to determine if any faces are present in the image at Block 306. The face detection algorithm may be OpenCV with the "haarcascade_frontalface_default" model, for example.

If it is determined at Block 308 that more faces were present than the last check, or if the difference between images from last time is significant, then the image is sent to an external, cloud-based face identification service 230 at Block 310 to identify each face and provide a list of user IDs back to the face detection module 222.

The face detection module 222 passes the list of user IDs to the policy enforcement module 228. The policy enforcement module 228 compares the list of user IDs with the access control list it already has for the currently displayed document at Block 312. If a user ID for user Y is present in the list passed by the face detection module 222 but is not on the access control list then the policy enforcement module 228 blurs the screen at Block 314. The policy enforcement module 228 then initiates an approval request for user Y to the approval service 250 at Block 316. The approval request may be directed to different conditions as will be discussed in greater detail with reference to the respective flowcharts in FIGS. 6-8.

Based on an approval or an override being provided back to Block 318 for user Y, the desktop 220 unblurs the screen at Block 320. If an approval or override is not received for user Y, then the screen remains blurred. The process loops to Block 322 for a wait period before the webcam 210 captures another image. The wait period may be 2 seconds, for example, but may vary depending on the architecture 200.

Figure 6:
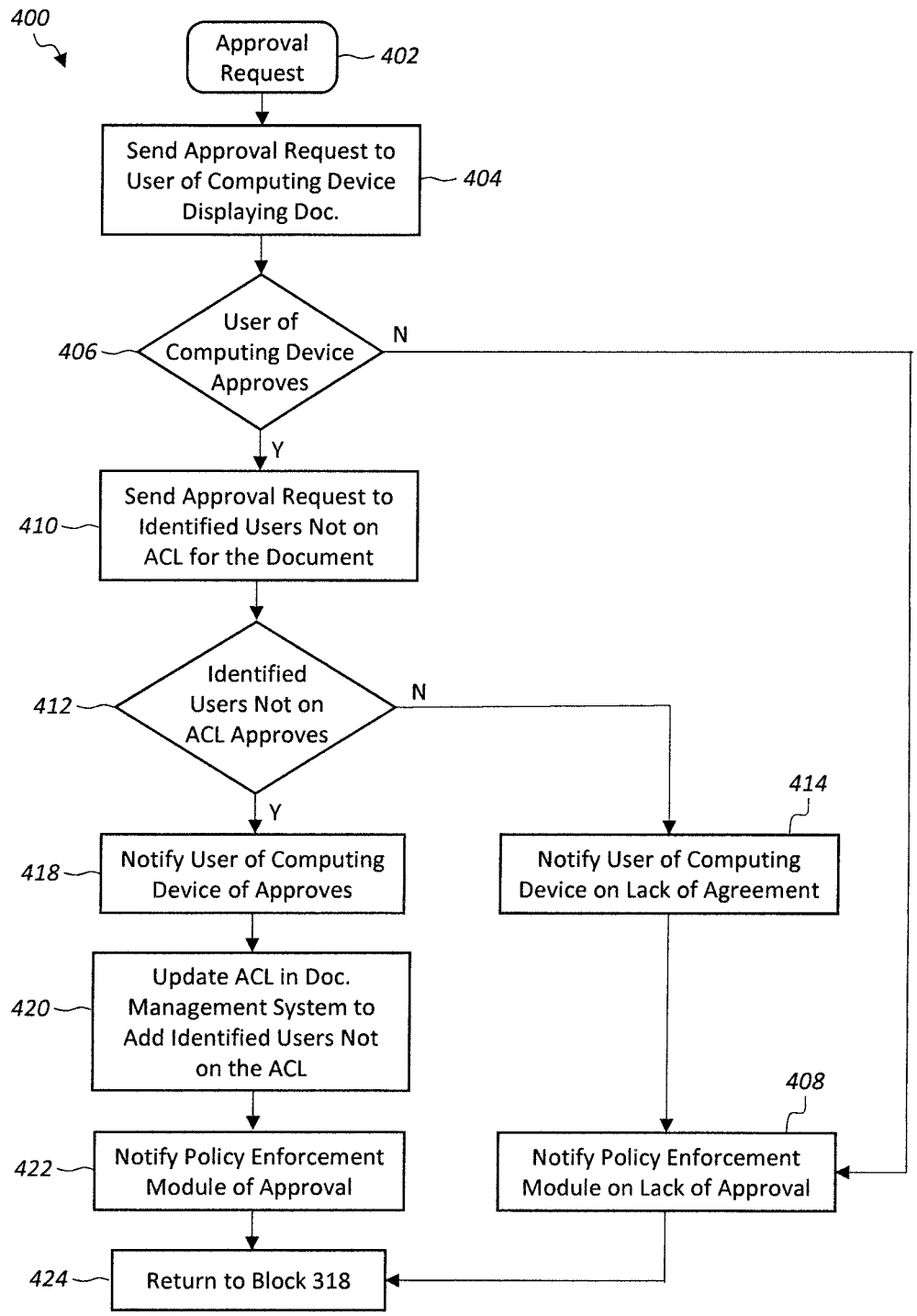
FIG. 6 is a flowchart illustrating an approval process condition for input into the flowchart illustrated in FIG. 5 when viewers are identified but are not authorized to view the documents.

Referring now to FIG. 6, a flowchart 400 illustrating a method for authorizing a viewer to view documents within the architecture illustrated in FIG. 3 will be discussed. The flowchart 400 is directed to when a viewer has been identified by the face identification service 230 but is not authorized to view the documents.

The approval request starts at Block 402, and an approval request is sent to the user (user X) of the computing device 220 displaying the document at Block 404. The user of the computing device 220 is typically the document owner. The approval service 250 sends an approval request to user X asking if user Y should be approved to view this document. User X has a mobile device 260 executing an approval microapp 262, such as a Slack app with button callbacks. User X responds to the approval request at Block 406.

A determination is made at Block 406 if user X approves user Y viewing the document. If user X does not approve, then the policy enforcement module 228 is notified at Block 408. If user X approved the request then a second request is sent at Block 410 to a mobile device 270 of user Y to ask them to agree to any terms and conditions associated with the document (e.g., a non-disclosure agreement). This uses a similar mechanism (approval microapp 272) to the approval request sent to user X. User Y responds to the approval request at Block 412.

If user Y does not agree at Block 406, then user X is notified at Block 414. From Block 214, the policy enforcement module 34 is then notified at Block 408.

If user Y agrees, then user X is notified of the agreement at Block 418. The approval service 250 contacts the document management service 240 at Block 420 to add user Y to the access control list 242 for the document. The policy enforcement module 228 is contacted at Block 422 to inform it that user Y is now authorized to view the document. The approval process returns to Block 318 in FIG. 5 at Block 424 so that the policy enforcement module 228 unblurs the screen to allow normal operation.

If user Y did not approve, or user X did not agree, then the access control list is not updated but the screen is still unblurred. It is assumed at this point that user X will either close the document or remove user Y from the meeting room. Again, the approval process returns to Block 318 in FIG. 5 at Block 424.

Figure 7:
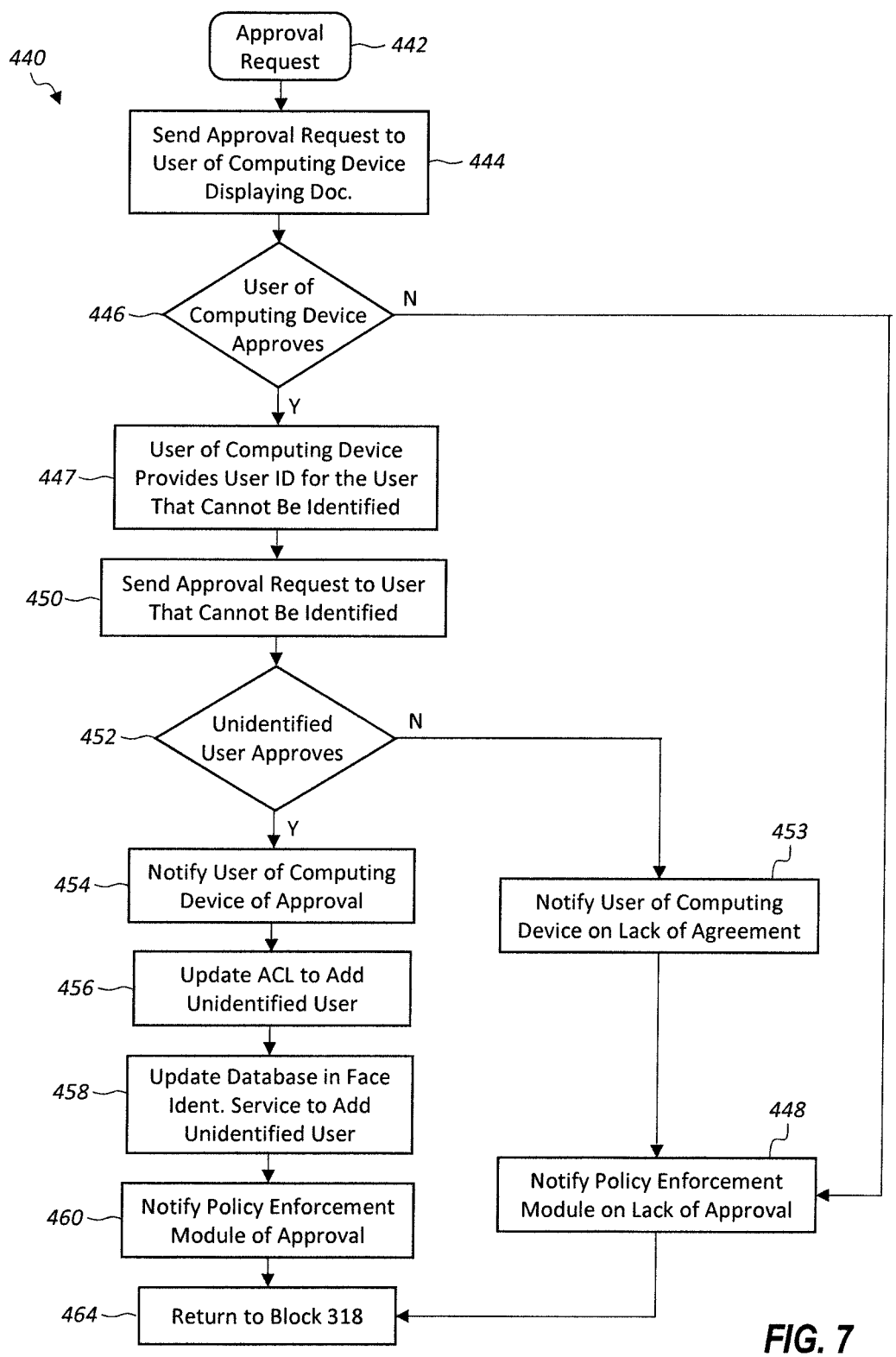
FIG. 7 is a flowchart illustrating another approval process condition for input into the flowchart illustrated in FIG. 5 when viewers cannot be identified.

Referring now to FIG. 7, a flowchart 440 illustrating a method for authorizing a viewer to view documents within the architecture illustrated in FIG. 3 will be discussed. The flowchart 440 is directed to when a viewer cannot be identified by the face identification service 230.

The approval request starts at Block 442, and an approval request is sent to the user (user X) of the computing device 220 displaying the document at Block 444. The user of the computing device 220 is typically the document owner. The approval service 250 sends an approval request to user X asking if user Y should be approved to view this document. User X has a mobile device 260 executing an approval microapp 262. User X responds to the approval request at Block 446.

A determination is made at Block 446 if user X approves user Y viewing the document. If user X does not approve, then the policy enforcement module 228 is notified at Block 448. If user X approved the request then user X provides a user ID for user Y at Block 447. User X will see the image of user Y in the approval microapp 262 and provide the user ID for user Y. Here, user X is performing the facial recognition function along with the approval.

A second request may then be sent at Block 450 to a mobile device 270 of user Y to ask them to agree to any terms and conditions associated with the document (e.g., a non-disclosure agreement). This uses a similar mechanism (approval microapp 272) to the approval request sent to user X. User Y responds to the approval request at Block 452.

If user Y does not agree at Block 452, then user X is notified at Block 453. From Block 453 the policy enforcement module 228 is then notified at Block 448.

If user Y agrees, then user X is notified of the agreement at Block 454. The approval service 250 contacts the document management service 240 at Block 456 to add user Y to the access control list 242 for the document. The approval service 250 also contacts the face identification service 230 at Block 458 to update the database 231 with an image of the face of user Y along their user ID.

The policy enforcement module 228 is contacted at Block 460 to inform it that user Y is now authorized to view the document. The approval process returns to Block 318 in FIG. 5 so that the policy enforcement module 228 unblurs the screen to allow normal operation.

If user Y did not approve, or user X did not agree, then the access control list is not updated but the screen is still unobscured. It is assumed at this point that user X will either close the document or remove user Y from the meeting room. Again, the approval process returns to Block 318 in FIG. 5 at Block 464.

Figure 8:
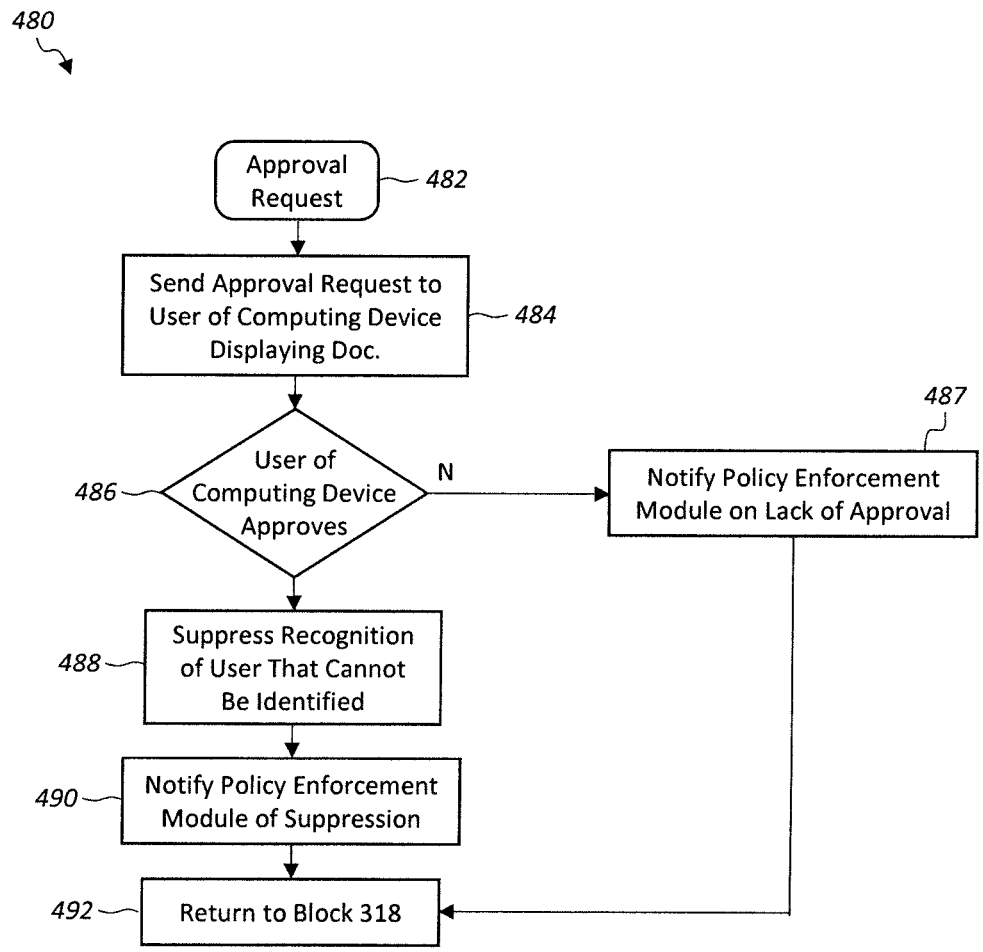
FIG. 8 is a flowchart illustrating yet another approval process condition for input into the flowchart illustrated in FIG. 5 when recognition of unidentified faces is suppressed.

Referring now to FIG. 8, a flowchart 480 illustrating a method for an override feature to unblur the screen when a viewer cannot be identified within the architecture illustrated in FIG. 3 will be discussed.

The approval request starts at Block 482, and an approval request is sent to the user (user X) of the computing device 220 displaying the document at Block 484. The user of the computing device 220 is typically the document owner. The approval service 250 sends an approval request to user X asking if user Y should be approved to view this document. User X has a mobile device 260 executing an approval microapp 262. User X responds to the approval request at Block 486.

A determination is made at Block 486 if user X approves user Y viewing the document. If user X does not approve, then the policy enforcement module 228 is notified at Block 487. If user X approved the request then recognition of the unidentified viewer is suppressed at Block 488. The policy enforcement module 228 is then notified at Block 490. The approval process returns to Block 318 in FIG. 5 so that the policy enforcement module 228 unblurs the screen to allow normal operation.

Another aspect of the disclosure is directed to a non-transitory computer readable medium for a policy enforcement module 228 cooperating with a computing device 220 comprising a face detection module 222 coupled to at least one webcam 210 to detect faces of viewers that are within a field of view of the at least one webcam 210, to provide an image of the detected faces to a face identification service 230, and to receive user IDs from the face identification service 230 on the detected faces that have been identified. The computing device 220 includes a document viewer module 224 configured to retrieve a document 227 for display, with the document being retrieved based on a link to the document.

The policy enforcement module 228 is coupled to the face detection module 222 and to the document viewer module 224. The non-transitory computer readable medium has a plurality of computer executable instructions for causing the policy enforcement module 228 to perform the above method steps. For example, the policy enforcement module 228 receives from the face identification service 230 user IDs on detected faces that have been identified in the image, and uses the link to the document being retrieved for display to query metadata associated with the document to determine an access control list for the document. The user IDs of the detected faces that have been identified are compared to user IDs on the access control list to determine authorized viewers of the document. The policy enforcement module 228 obscures display of the document if one of the identified faces is not authorized to view the document.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A computing device comprising:
   at least one webcam;
   a processor and a memory coupled to said processor and configured to:
   detect faces of viewers that are within a field of view of said at least one webcam;
   provide an image of the detected laces to a face identification service;
   receive user identifications (IDs) from the face identification service on the detected faces that have been identified; retrieve a document for display, with the document being retrieved based on a link to the document;
   receive, at the computing device, the user IDs on the detected faces that have been identified in the image;
   use, at the computing device, the link to the document to query metadata associated with the document to determine an access control list for the document, with the metadata being queried where the document is stored;
   compare, at the computing device, the user IDs of the detected faces that have been identified to user IDs on the access control list to determine authorized viewers of the document;
   display the image of the detected faces with a respective user ID and authorization status overlaid on each identified face;
   display the image of the detected faces with an unknown status for each face that cannot be identified; and
   obscure display of the document, at the computing device, if one of the identified faces is not authorized to view the document.

2. The computing device according to claim 1 wherein said processor is further configured to also display a respective symbol overlaid on each identified face.

3. The computing device according to claim 2 wherein if the image includes faces that cannot be identified, then said processor is further configured to perform at least one of the following:
   overlay text indicating that a face cannot be identified, or leave each face that cannot be identified as is without any markings.

4. The computing device according to claim 1 wherein said processor is further configured to perform the following:
   access an approval service to add to the access control list a user ID of the identified face not authorized to view the document; and
   unobscure display of the document since a viewer with the identified face not authorized to view the document is now authorized to view the document.

5. The computing device according to claim 4 wherein the approval service is configured to perform the following:
   send an approval request to an owner of the document requesting approval of the viewer with the identified face not authorized to view the document to be added to the access control list;
   if the owner of the document approves, then send an approval request to the viewer having the identified face not authorized to view the document; and
   if the viewer having the identified face not authorized to view the document accepts the approval request, then update the access control list to include the user ID of the identified face not authorized to view the document.

6. The computing device according to claim 5 wherein the approval request to the viewer having the identified face not authorized to view the document includes terms and conditions for the viewer to agree to before accepting the approval request.

7. The computing device according to claim 1 wherein said processor further receives information from the face identification service on each face that cannot be identified; and
   said processor is further configured to perform the following:
   contact the approval service to add a user ID of each face that cannot be identified to the access control list if not already on the access control list;
   provide an image of each face that cannot be identified along with the user ID to the face identification service so that a database of the face identification service is updated; and
   unobscured display of the document since each corresponding viewer that cannot be identified is now authorized to view the document.

8. The computing device according to claim 7 wherein the approval service is configured to perform the following before adding the user ID of each face that cannot be identified to the access control list if not already on the access control list:
   send an approval request to an owner of the document requesting approval of each viewer that cannot be identified to be added to the access control list;
   if the owner of the document approves, then the owner of the document provides a user ID for each viewer that cannot be identified;
   send an approval request to each viewer that cannot be identified; and
   receive acceptance from each viewer that accepted the approval request.

9. The computing device according to claim 1 wherein said processor further receives information from the face identification service on each face that cannot be identified; and
   wherein said processor is further configured to perform the following: suppress recognition of each face that cannot be identified if an owner of the document approves the suppression; and unobscure display of the document.

10. The computing device according to claim 1 wherein the metadata of the document comprises user IDs of viewers allowed to view the document.

11. The computing device according to claim 1 is configured as a virtual computing device.

12. The computing device according to claim 1 wherein obscuring display of the document comprises at least one hiding, blurring, and pixelating the document.

13. A method for operating a policy enforcement module cooperating with a computing device comprising at least one webcam;
a face detection module coupled to the at least one webcam to detect faces of viewers that are within a field of view of the at least one webcam, to provide an image of the detected faces to a face identification service, and to receive user identifications (IDs) from the face identification service on the detected faces that have been identified; and
a document viewer module configured to retrieve a document for display, with the document being retrieved based on a link to the document, the method comprising:
receiving from the face identification service user IDs on detected faces that have been identified in the image;
using the link to the document being retrieved for display to query metadata associated with the document to determine an access control list for the document, with the metadata being queried where the document is stored;
comparing the user IDs of the detected faces that have been identified to user IDs on the access control list to determine authorized viewers of the document;
displaying the image of the detected faces with a respective user ID and authorization status overlaid on each identified face;
displaying the image of the detected faces with an unknown status for each face that cannot be identified; and
obscuring display of the document if one of the identified faces is not authorized to view the document.

14. The method according to claim 13 wherein the policy enforcement module is further operated to display a respective symbol overlaid on each identified face.

15. The method according to claim 13 wherein the policy enforcement module is further configured to perform the following:
accessing an approval service to add to the access control list a user ID of the identified face not authorized to view the document; and
unobscuring display of the document since a viewer with the identified face not authorized to view the document is now authorized to view the document.

16. The method according to claim 13 wherein the face detection module further receives information from the face identification service on each face that cannot be identified; and
wherein the policy enforcement module is further operated to perform the following:
contacting the approval service to add a user ID of each face that cannot be identified to the access control list if not already on the access control list;
providing an image of each face that cannot be identified along with the user ID to the face identification service so that a database of the face identification service is updated; and
unobscuring display of the document since each corresponding viewer that cannot be identified is now authorized to view the document.

17. The method according to claim 13 wherein the face detection module receives information from the face identification service on each face that cannot be identified; and
wherein the policy enforcement module is further configured to perform the following:
suppressing recognition of each face that cannot be identified if an owner of the document approves the suppression; and
unobscuring display of the document.

18. A non-transitory computer readable medium for a policy enforcement module cooperating with a computing device comprising a face detection module coupled to at least one webcam to detect faces of viewers that are within a field of view of the at least one webcam, to provide an image of the detected faces to a face identification service, and to receive user identifications (IDs) from the face identification service on the detected faces that have been identified;
a document viewer module configured to retrieve a document for display, with the document being retrieved based on a link to the document; with the policy enforcement module coupled to the face detection module and to the document viewer module, and with the non-transitory computer readable medium having a plurality of computer executable instructions for causing the policy enforcement module to perform steps comprising:
receiving from the face identification service user IDs on detected faces that have been identified in the image;
using the link to the document being retrieved for display to query metadata associated with the document to determine an access control list for the document, with the metadata being queried where the document is stored;
comparing the user IDs of the detected faces that have been identified to user IDs on the access control list to determine authorized viewers of the document;
displaying the image of the detected faces with a respective user ID and authorization status overlaid on each identified face;
displaying the image of the detected faces with an unknown status for each face that cannot be identified; and
obscuring display of the document it one of the identified faces is not authorized to view the document.

19. The non-transitory computer readable medium according to claim 18 wherein the policy enforcement module is further configured to perform the following:
accessing an approval service to add to the access control list a user ID of the identified face not authorized to view the document; and
unobscuring display of the document since a viewer with the identified face not authorized to view the document is now authorized to view the document.

20. The non-transitory computer readable medium according to claim 18 wherein the face detection module further receives information from the face identification service on each face that cannot be identified; and
wherein the policy enforcement module is further configured to perform the following:

contacting the approval service to add a user ID of each face that cannot be identified to the access control list if not already on the access control list;

providing an image of each face that cannot be identified along with the user ID to the face identification service so that a database of the face identification service is updated; and unobscuring display of the document since each corresponding viewer that cannot be identified is now authorized to view the document.

\* \* \* \* \*